D. R. BOWEN AND C. F. SCHNUCK.
MACHINE FOR TREATING RUBBER AND SIMILAR MATERIALS.
APPLICATION FILED DEC. 24, 1917.

1,354,452.

Patented Sept. 28, 1920.
9 SHEETS—SHEET 1.

INVENTORS
D. R. Bowen and C. F. Schnuck
BY
ATTORNEY

D. R. BOWEN AND C. F. SCHNUCK.
MACHINE FOR TREATING RUBBER AND SIMILAR MATERIALS.
APPLICATION FILED DEC. 24, 1917.
1,354,452. Patented Sept. 28, 1920.
9 SHEETS—SHEET 4.
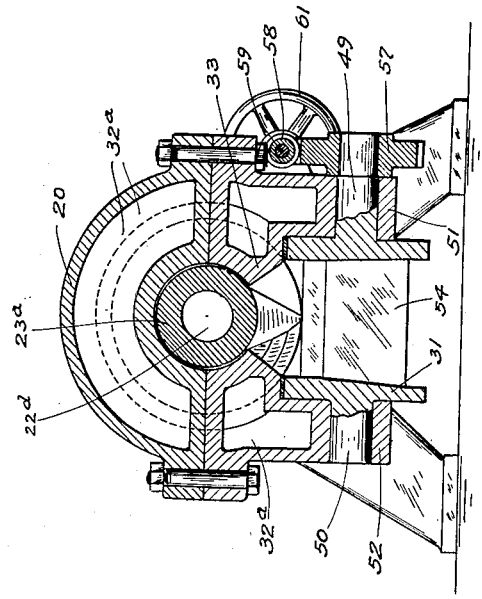
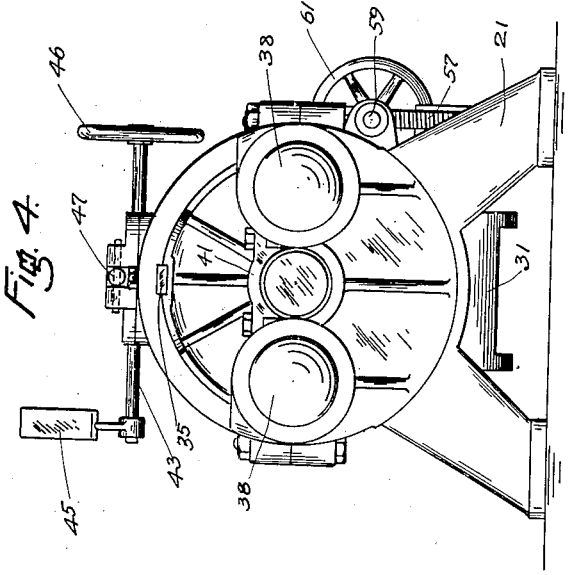
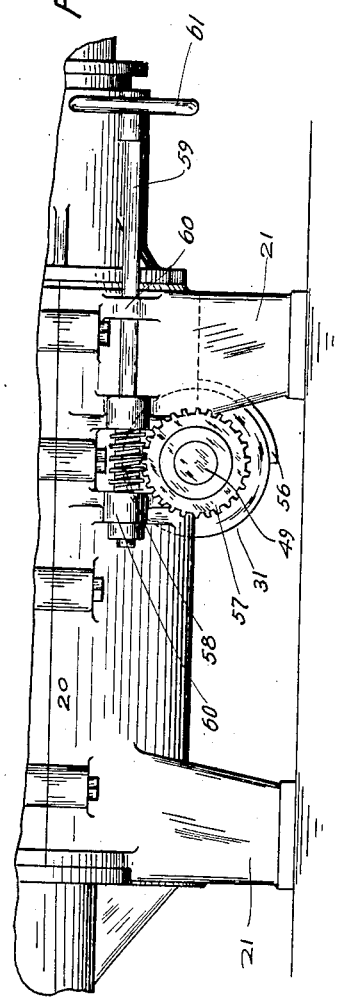
INVENTORS
D. R. Bowen & C. F. Schnuck
BY
ATTORNEY D. R. BOWEN AND C. F. SCHNUCK.
MACHINE FOR TREATING RUBBER AND SIMILAR MATERIALS.
APPLICATION FILED DEC. 24, 1917.
1,354,452.
Patented Sept. 28, 1920.
9 SHEETS—SHEET 5.
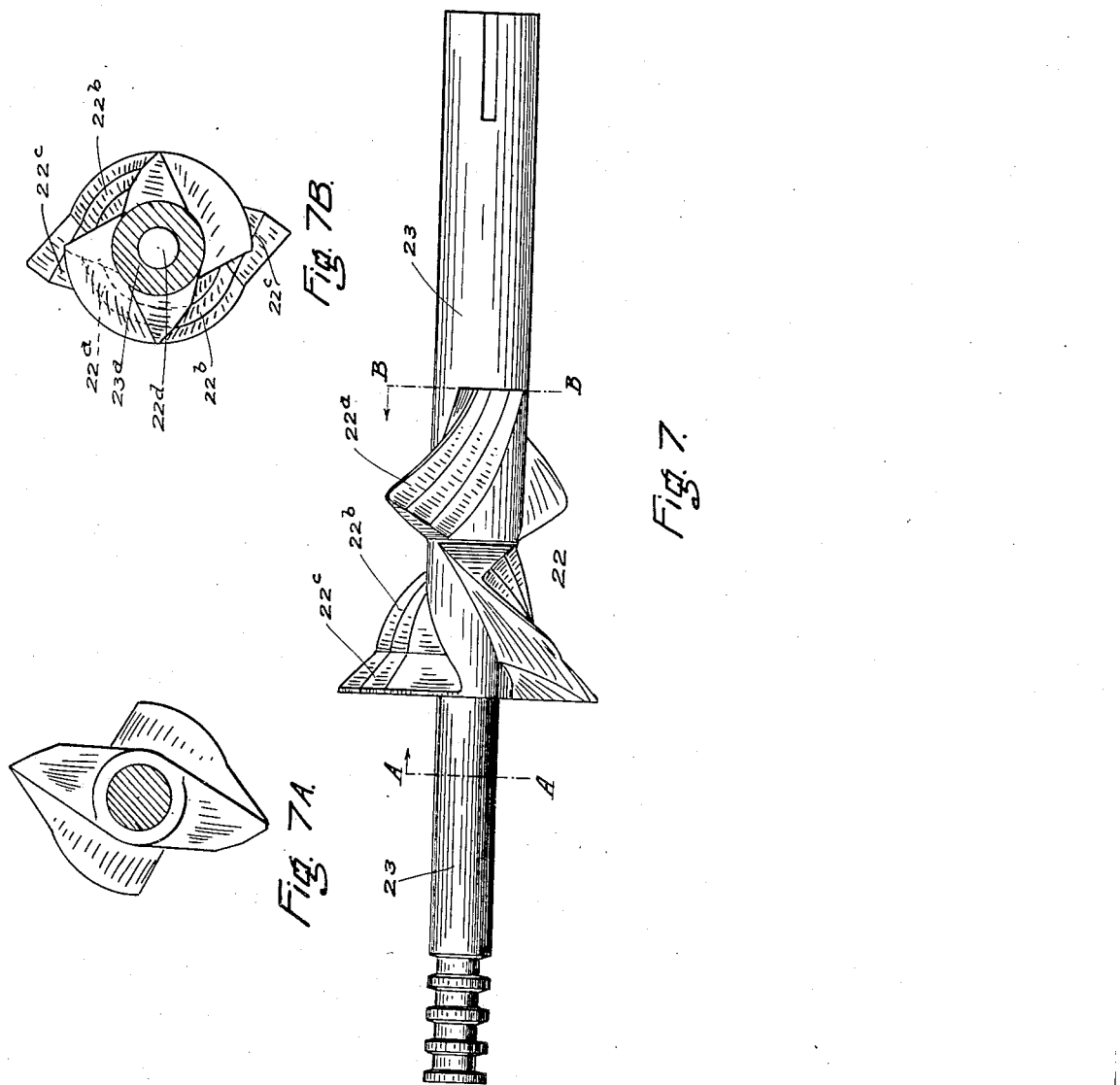
INVENTORS
D. R. Bowen and C. F. Schnuck
BY
ATTORNEY

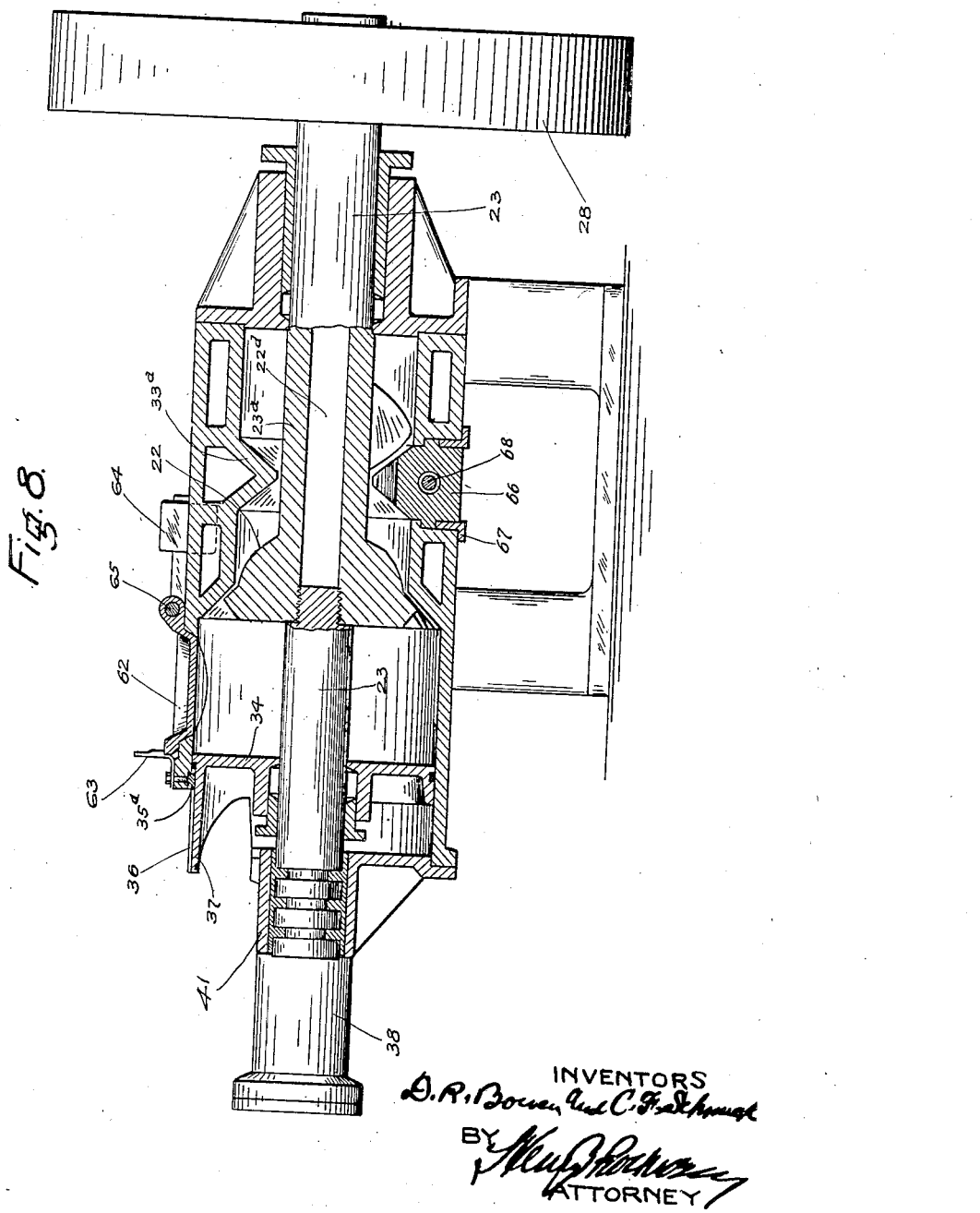

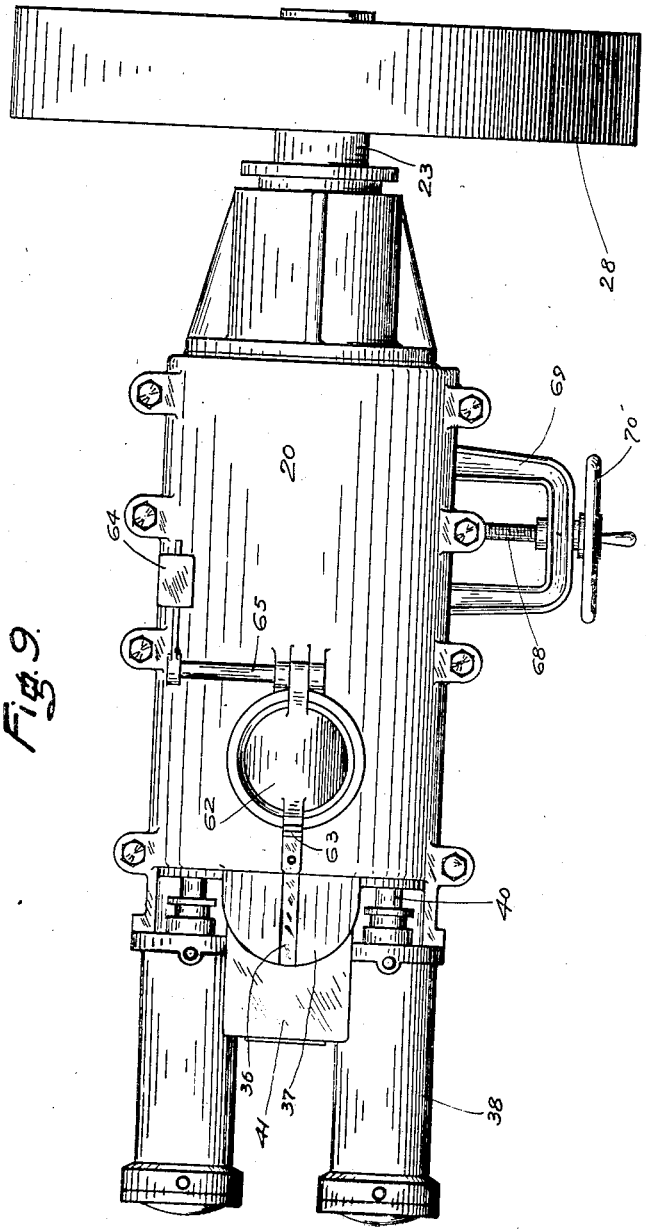

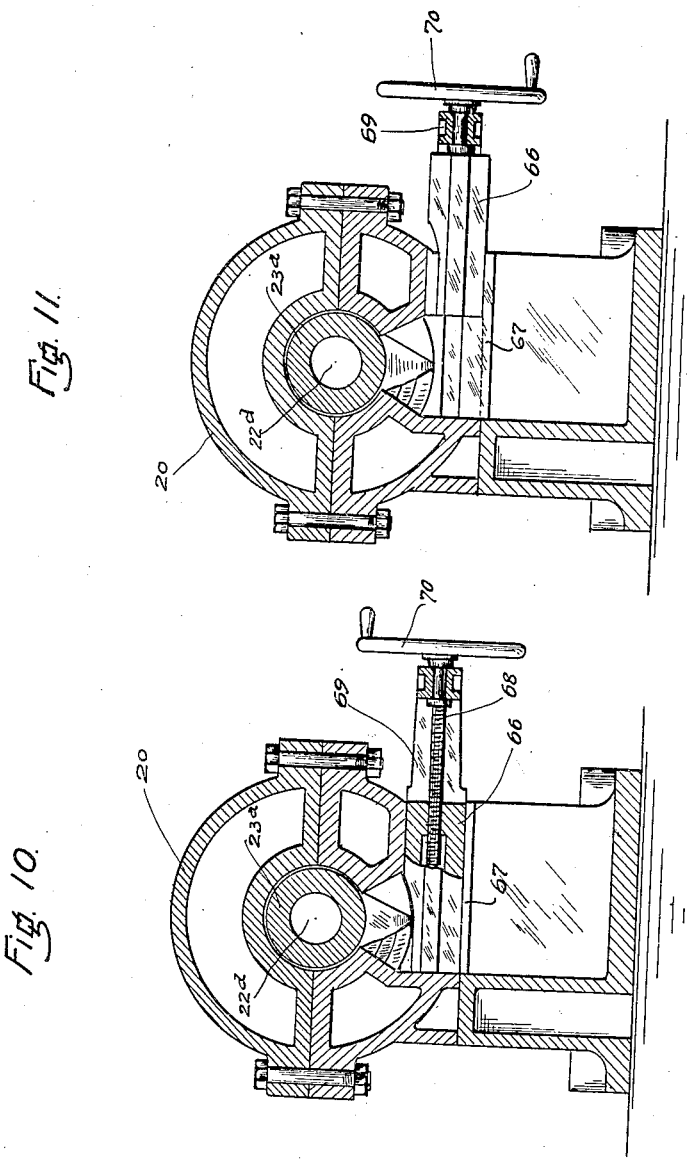

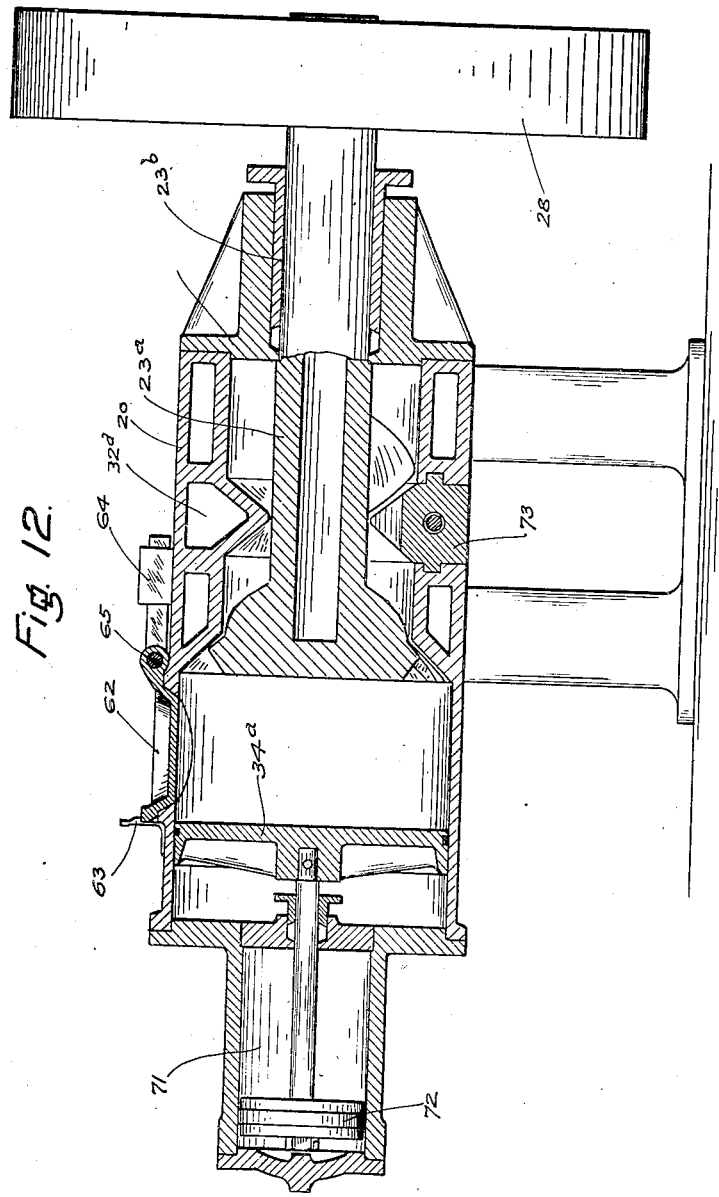

UNITED STATES PATENT OFFICE.

DAVID R. BOWEN AND CARL F. SCHNUCK, OF ANSONIA, CONNECTICUT, ASSIGNORS TO FARREL FOUNDRY & MACHINE COMPANY, OF ANSONIA, CONNECTICUT, A CORPORATION OF CONNECTICUT.

MACHINE FOR TREATING RUBBER AND SIMILAR MATERIALS.

1,354,452.  Specification of Letters Patent.  Patented Sept. 28, 1920.

Application filed December 24, 1917.  Serial No. 208,635.

*To all whom it may concern:*

Be it known that I, DAVID R. BOWEN and CARL F. SCHNUCK, both citizens of the United States, and both residing in Ansonia, county of New Haven, and State of Connecticut, have invented certain new and useful Improvements in Machines for Treating Rubber and Similar Materials, of which the following is a full, clear, and exact description.

This invention pertains to rubber mixers and like machines and it has particular reference to machines for mixing rubber, usually in the form of fairly large chunks, with filling or coloring material, such as lamp-black, until a smooth homogeneous plastic mass is obtained. A machine of this general type is disclosed in our application, Serial No. 191,413, where the mixing is obtained by an extrusion process, in which the batch of material is worked back and forth in a mixing or working chamber through an intermediate extrusion space, while at the same time the material is mashed or smeared against the chamber walls. In the machine shown in the prior application, the batch of material is fed into the working chamber from the top at the intermediate portion of the chamber, and the material is forced downward into the chamber and against the rotor blades by a vertically acting pressure device or follower. Discharge of the machine is effected by lowering the entire lower portion of the chamber wall, which lower portion is for this purpose hinged to the main part of the casing or chamber wall at one side of the chamber.

The present improvements relate more especially to the means for and method of charging the working chamber.

One of the principal objects of the invention is to provide a rubber or other plastic mixer of very compact and convenient arrangement, in which the material to be treated, consisting of rubber chunks and powder or the like, for example, can be very readily and conveniently charged into the mixing chamber at one end of the latter.

It is likewise proposed to furnish a rubber mixer in which the different ingredients are introduced into the mixing chamber from the end in a direction approximately parallel to the rotor axis and wherein provision is made for closing the end of the mixing chamber during mixing to prevent effectively the escape of the material being worked.

Another object of the invention is to provide improved means for discharging the mixed material from the mixing chamber.

Still another object of our invention is to provide a rubber mixer of the extrusion type in which a transverse rib or abutment which is used in conjunction with the mixing chamber and rotor for producing the extrusion effect is water cooled so as to prevent intense heating and vulcanization of the rubber mass in spite of the high pressure to which it is subjected for producing proper mixing.

To these and other ends, the invention consists in the novel features and combinations of parts to be hereinafter described and claimed.

In the accompanying drawings,

Fig. 4 is an end elevation of the machine, looking from the left hand end of Fig. 1;

Fig. 5 is a transverse section of the machine with the discharge valve in the open position;

Fig. 6 is a partial front elevation of the machine, showing the mechanism for operating the discharge valve;

Fig. 7 is a detail elevation of the rotor;

Figure 1:
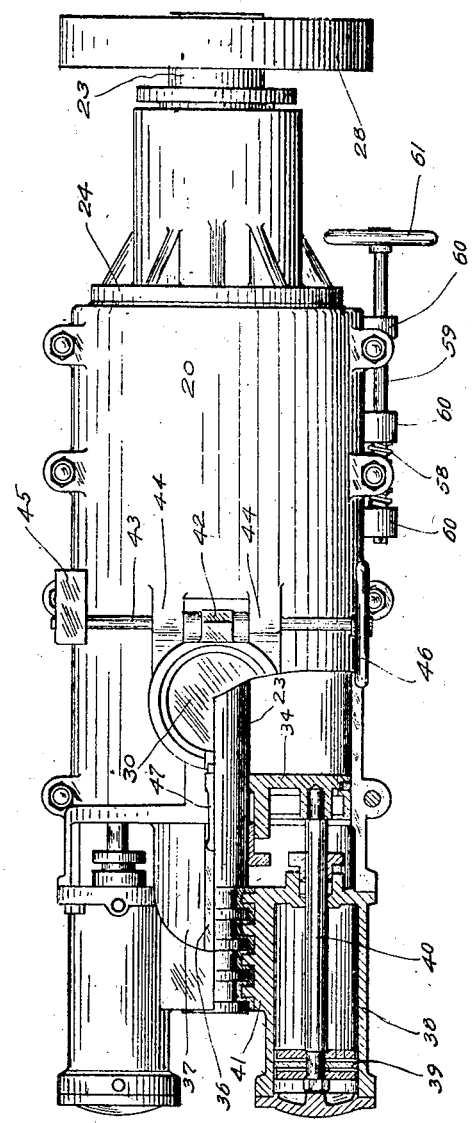
Figure 1 is a plan view, partly in section, of a rubber mixer embodying our improvements.

Fig. 7<sup>A</sup> is a section on line A—A of Fig. 7;

Fig. 7<sup>B</sup> is a section on line B—B of Fig. 7;

Fig. 8 is a longitudinal section of a mixing machine of somewhat modified form;

Fig. 9 is a plan view of the machine shown in Fig. 8.

Figs. 10 and 11 are transverse sections of the machine shown in Fig. 8, with the discharge valve in the closed and open positions respectively; and Fig. 12 is a longitudinal section of a still further modified form of machine embodying our improvements.

We have shown our improvements applied to a rubber mixer which is very similar in some features to that disclosed in our previous application, Serial No. 191,413, but it will be understood from the following description that in at least some aspects of the invention the type of the machine may be considerably varied.

In the embodiment shown, a casing 20 of generally cylindrical shape, horizontally arranged, is supported by legs 21 standing on the floor. In the casing 20 is a central mixing element or rotor 22, having a shaft 23, with bearings in heads 24, 25 at the respective ends of the casing. The casing is divided transversely into a main working or mixing chamber 26 and a feed chamber 27, said chambers being in horizontal alinement, with one chamber at one end of the casing, and the other chamber at the other end. The rotor 22 may be rotated by power applied to a pulley 28. The feed chamber 27 is provided at the top with a charging opening 29, controlled by a door 30, and the working chamber 26 is provided at its lower portion intermediate of the ends with a rotary discharge closure or valve 31.

Referring now to the details of the machine, it will be observed that the wall of the working chamber 26 is water jacketed, thus providing a hollow space 32 through which cooling water may circulate. The working chamber is provided intermediate of its ends with a transverse extrusion rib 33, which is of substantially V-shaped cross-section, as in our prior application. The rotor 22 has a mixing blade $22^a$ at one side of this rib, and another mixing blade $22^b$ at the other side of the rib. When material has been forced into the working chamber from the feed chamber 27, it is worked back and forth in a generally longitudinal direction in the working chamber, substantially as described in our prior application, each blade mashing or smearing the material against the side wall of the working chamber, and at the same time forcing it in a generally longitudinal direction with respect to the chamber over the rib and through the restricted extrusion space which is provided between the inner part of rib and the adjacent part of the rotor. At the same time that one of the blades is forcing the material out of one end of the working chamber and through the extrusion space into the other chamber end, a blade in such other chamber end is similarly working the material and forcing it into the first mentioned end of the working cylinder.

In the particular form shown, the feed chamber 27 is of greater diameter than the working chamber, and, as it should be of about the same capacity as said working chamber it is therefore of less length. Thus, the piston or plunger 34 which is provided in the feed chamber for charging the material from said chamber into the working chamber has a feed stroke which is of less length than the working chamber. Where the feed chamber joins the working chamber, the end portion of the latter is outwardly flared, as shown at 35, thus presenting an inclined or beveled surface over which the material can be moved without undue resistance in passing from the feed chamber into the working chamber. In effect, one end portion of the working chamber is laterally enlarged, i. e., of increased diameter, providing a sort of funnel for the introduction of the fresh material, and in the flared or funnel shaped portion 35 there operates an extension $22^c$ at the outer end of the blade $22^b$, which extension is constructed along sides generally similar to those of the blades $22^a$ and $22^b$, but which conforms to the funnel shaped part 35 so as to mash or smear the material against the same, while simultaneously feeding it in an inward direction, i. e., toward the transverse extrusion rib 33.

In the present case, the transverse rib is adapted to be cooled by the circulation of water in the jacket of the casing, for which purpose the rib is of hollow form, having a water space $32^a$ within the same, which is in communication with and forms part of the water space 32 extending around the wall of the working chamber.

Figure 2:
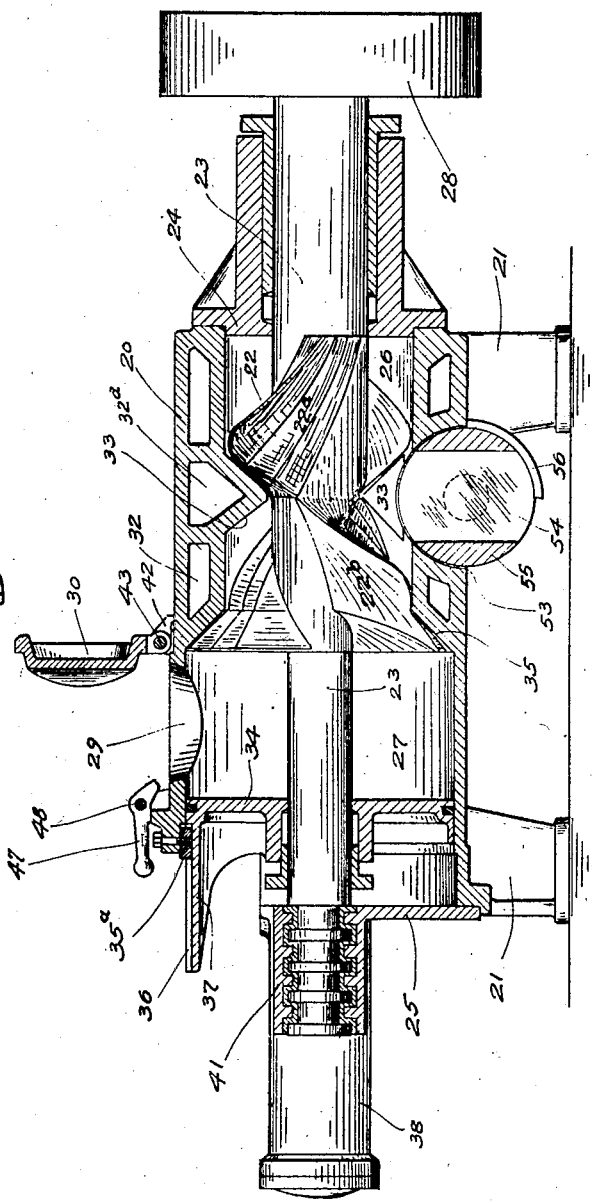
Fig. 2 is a longitudinal central section of the machine with the charging door open and the discharge closure or valve in the open position.

In the example now under discussion, the material is fed from the feed chamber into the working chamber by the longitudinally movable plunger or follower 34, which has a central opening whereby it fits over the rotor shaft 23. The rotor shaft forms a support for the plunger on which the latter has a rectilinear sliding movement back and forth in the feed chamber. During this sliding movement rotation of the plunger is prevented by a spline $35^a$, engaging a groove 36, in an extension 37 at the upper part of the plunger projecting to the left with reference to Fig. 2. The plunger is adapted to be operated by a pair of fluid pressure cylinders 38, having pistons 39, and piston rods 40 connected with the body of plunger 34 at opposite sides of the center. The two cylinders 38 are in horizontal alinement on opposite sides of the longitudinal axis of the machine, as shown in Fig. 4, and they are supported on the head casting 25 at opposite sides of the left hand bearing 41 of the rotor shaft.

Figure 3:
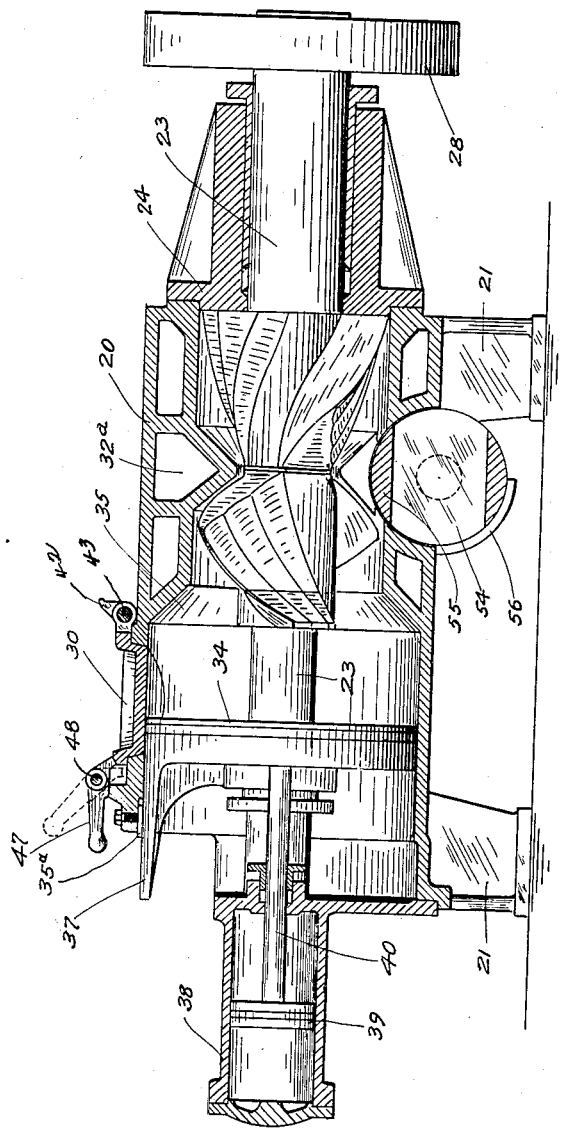
Fig. 3 is a view similar to Fig. 2, showing the charging door closed and the discharge valve closed, the feed piston being in a different position from that shown in Fig. 2.

The swinging charging door 30 is fixed at 42 to a rock shaft 43 disposed transversely on the upper part of the machine in bearing brackets 44. On one end of the rock shaft is a counter-weight 45 which normally holds the swinging door in the open position, shown in Fig. 2. At the opposite end of the rock shaft is a hand wheel 46 which may be turned in order to swing the door to the closed position, whereupon it is caught and held in that position by a suitable latch. In the particular form shown, we use a pivoted gravity latch 47, pivoted at 48, to the casing at one side of the charging opening. When the door closes, the gravity dog or latch automatically locks it, as shown in Fig. 3. When it is desired to open the charging door, the gravity latch is swung to the position indicated in the dotted lines in Fig. 3 where it is out of the path of the door, and the latter can thereupon be opened by turning the hand wheel 46 in the proper direction.

The rotary discharge valve 31 consists essentially of a cylindrical body, having trunnions 49, 50 at the respective ends, journaled in bearings 51, 52 of the frame, so that the valve may turn on a horizontal axis. The cylindrical body operates in a cut-away portion 53 of the working chamber wall at the lower intermediate part thereof in line with the rib 33, which rib terminates at the respective ends of a discharge opening 54 extending diametrically through the valve. When the valve is in the position shown in Figs. 2 and 5, the opening 54 permits the material to pass out of the working chamber and to be discharged at the under portion of the machine, intermediate of the ends of the working chamber, the upper end of the valve opening being in communication with the gap between the respective lower ends of the rib 33, and the lower end of the valve opening being comparatively close to the floor. When, on the other hand, the valve is turned to the position shown in Fig. 3, the discharge opening in the bottom of the working chamber is closed by a segment 55 of the valve body. This segment 55, with its smooth outer surface, is located between the ends of the rib, and forms, in effect, a partial continuation of the rib. A stop 56 applied to the valve body coöperates with stop surfaces on the lower portion of the chamber wall and limits the rotation of the valve to a quarter turn. At one limit of its movement it is in the closed position, and at the other limit of its movement it is in the open position. Any suitable means may be used for operating the valve, but we have shown a gear wheel 57, fixed on the end of trunnion 49, and engaged by a worm 58 on a shaft 59, mounted on the side of the machine in brackets 60, and adapted to be operated by a hand wheel 61, which in the example shown is arranged at the right hand end of the machine (Fig. 6).

The operation of the machine is substantially as follows: The door 30 being in the open position shown in Fig. 2, the lumps of rubber and the powdered coloring material to be mixed are poured into the feed chamber 27, through the opening 29. The rotor 22 is in constant rotation. The feed chamber having been charged, and the discharge valve being in the closed position, the plunger or follower 34 is moved to the right with reference to Fig. 2, for the purpose of charging the batch into the working chamber. In this operation, the fluid pressure cylinders and pistons 38, 39 are operated in an obvious manner. The plunger forces the material lengthwise in the feed chamber and through the funnel-shaped portion 35 of the working chamber into the main part of said chamber, while the rotor blades are rotating. As the plunger moves to the right, it passes over the charging opening 29, and when the plunger has been moved almost into contact with the left hand rotor blades (Fig. 3) its motion is arrested, the feeding movement being then complete. Suitable means are of course provided for preventing contact of the plunger with the rotor blades. The plunger is held in the right hand position, that is to say, at or near the limit of its movement in the direction of the working chamber substantially throughout the mixing operation so as to hold the material in the working chamber and subject it to pressure therein. During the mixing operation, the plunger 34 acts in the nature of an end wall or closure for the working chamber, as will be obvious. The plunger not only serves as a charging device, but as a movable closure for the opening in the end of the working chamber, whereby said opening can be closed during the mixing operation to prevent the escape of the material being worked. The material is mixed by being smeared against the wall of the working chamber by the rotor blades, and by being extruded past the rib 33 alternately in opposite directions, as described in our prior application previously mentioned. When the mixing has continued for such a length of time that the batch is of the desired homogeneity and consistency, the valve 31 is opened by operation of the hand wheel 61 so as to discharge the machine from the bottom at a point in line with the extrusion rib, the ends of the rib acting as strippers during this operation. When the batch has been discharged, the door 30 can be opened for charging a fresh batch, but this cannot be done while the plunger 34 is in the right hand position, because the extension 37 covers the opening 29. It is therefore necessary to withdraw the plunger 34 to the initial or starting position before the feed chamber can be charged, and it is impossible for a careless employee to charge the feed chamber on the wrong side of the plunger.

The bearing 41 is formed as a thrust bearing to take up the longitudinal thrust on the rotor shaft due to the pressure of the material against the ends of the rotor blades by the plunger 34, or its equivalent.

In the machine shown in Figs. 8-11 inclusive, some of the parts are of modified construction and arrangement. In Fig. 8, the rotor 22 is of the same kind as that previously described, having an interior space $22^d$ in the shaft for the circulation of cooling water, which is generally employed in all forms of the machine. In the example shown in Fig. 8, the charging door 62 is locked in place by a spring latch 63, and is unprovided with an operating hand wheel, although it has the counter-weight 64 on the rock shaft 65 to which the door is secured. The discharge control closure of the machine is also of modified construction. The valve or closure 66 is of the sliding type, being mounted in ways to slide transversely of the working chamber at the lower portion thereof in line with the extrusion rib $33^a$. The block or closure 66 is adapted to be slid horizontally back and forth in suitable ways 67, by a horizontally threaded spindle 68, engaging interior screw threads in the slide block. The spindle 68 is mounted in a yoke 69, and is adapted to be turned by a hand wheel 70. The closed position of the slide block is shown in Fig. 10, and the open position in Fig. 11.

In the form shown in Fig. 12, the rotor shaft $23^a$ is provided with a single bearing $23^b$, which bearing is located at the right hand end of the machine. At the left hand end where the feed plunger $34^a$ is located, the rotor bearing is omitted. This permits the plunger to be operated by a single centrally located cylinder 71 and piston 72. The discharge of the machine is controlled by a slide block 73 similar to that described in connection with Figs. 8-11.

Various changes may be made in the details of the construction without departing from the scope of our invention as defined in the claims. For example, it will be obvious that we do not limit ourselves in all aspects of the invention to a machine in which the feeding or charging device in the feed chamber or charging chamber is constituted by a plunger or piston, as modification in this and other respects may be made without digressing from the broad inventive idea.

We do not claim broadly herein a rubber mixing machine, having a transverse extrusion rib and a rotor coöperating therewith, having blades at the opposite sides of the rib, as claimed in our application, Serial No. 191,413; nor do we claim broadly herein a machine having a discharge opening which is localized or confined to a point intermediate of the ends and in line with a transverse extrusion rib, as claimed in our application, Serial No. 208,135.

We do not claim broadly herein a rubber or other plastic mixer having a working chamber, and a rotor therein for working the material back and forth, said chamber having a charging opening at the end through which material to be treated may be conducted into the spaces at the rear faces of the rotor blades, as claimed in our application, Serial No. 270,838; but we wish to have it understood that the present invention is the first, so far as we are aware, to provide a rubber or other plastic mixer, in which the material is worked back and forth in the mixing chamber by the rotor and wherein the material to be treated is introduced in a direction generally lengthwise of the rotor into the end portion of the mixing chamber from a chamber or charge container which is in direct communication with the working chamber by way of an opening of sufficiently large size to permit the introduction of comparatively large pieces of material. The opening at the end of the mixing chamber extends approximately from the periphery of the casing to the rotor shaft, thus providing an opening of sufficient radial measurement or depth to permit large chunks of rubber to be introduced into the working chamber from the end. It is not necessary in all cases that the movable element adapted to close the end of the working chamber during mixing have the additional function of a pressure feed device, so long as it is adapted to close the open end of the chamber during mixing and thus prevent escape of any material through the end of the working chamber.

Neither do we claim herein the method of masticating rubber or similar material by subjecting it to a mixing extrusion under pressure or through a restricted opening, nor the method of mixing rubber with filling or coloring material which consists in extruding the mixture through a restricted opening, as this subject matter is claimed in our copending application, Serial No. 223,537, filed March 20, 1918.

What we claim is:—

1. In a machine of the character described, a mixing chamber, means including a transverse constriction in the chamber for causing extrusion of the treated material from one portion of the chamber into another, and means for charging the material into the mixing chamber at the end of the latter.

2. In a machine of the character described, a mixing chamber, and a rotor therein for working the material back and forth, said mixing chamber having a charging opening at the end through which large chunks of material can be introduced in a substantially straight line into the end portion of said chamber in a direction generally lengthwise of the rotor shaft.

3. In a rubber compounding machine, a working chamber, and a rotor journaled therein for working the material from one end of the chamber to the other and back again, said chamber having an opening at the end thereof adjacent the rotor shaft for the introduction of chunks of rubber to be treated into the working chamber, in a direction generally lengthwise of such chamber.

4. In a rubber mixer or like machine, a horizontally arranged mixing chamber, a rotor therein for working the material back and forth, means for charging the chamber at the end, and means for discharging the chamber at the bottom.

5. In a rubber mixer or like machine, a mixing chamber, means including a transverse constriction in the chamber for causing extrusion of the treated material, means for charging the chamber at one end, and means for discharging the chamber intermediate of its ends.

6. In a rubber mixer or like machine, a working chamber, a bladed rotor therein, a transverse constriction in the chamber wall coöperating with the rotor, means for charging the chamber at the end, and means for discharging the chamber intermediate of its ends.

7. In a machine of the character described, a horizontally arranged working cylinder, a rotor therein, said working chamber and rotor presenting in conjunction an intermediate extrusion space, means for charging the working chamber at one end, and means for discharging said chamber intermediate of its ends.

8. In a machine of the character described, a working chamber, a rotor therein for moving the material back and forth, said chamber having an opening at the end for the introduction of the materials to be mixed, and a charge container in direct and free communication with said working chamber by way of said opening.

9. In a rubber mixer or like machine, a casing having a working chamber and a feed chamber end to end in free communication with each other, a bladed rotor in the working chamber, and means in the feed chamber for forcing the material into the working chamber.

10. In a rubber mixer or like machine, a horizontally arranged casing having a working chamber and a feed chamber arranged end to end, a bladed rotor in the working chamber, and a power-operated feed device in the feed chamber for feeding the material from said chamber into the working chamber.

11. In a rubber mixer or like machine, a horizontally arranged casing divided transversely into a working chamber and a charging chamber in free communication with each other, and a bladed rotor in the working chamber.

12. In a rubber mixer or like machine, a horizontally arranged casing divided into a working chamber and a charging chamber in free communication with each other, a bladed rotor in the working chamber, and means in the charging chamber for forcing the material out of said chamber into the working chamber, the said charging chamber having a charging opening at the upper portion thereof.

13. In a rubber mixer or like machine, a horizontally arranged casing divided transversely into a working chamber and a charging chamber, a shaft having bearings at the respective ends of the casing and provided with mixing blades in the working chamber, and means in the charging chamber for forcing the material from said chamber into the working chamber.

14. In a rubber mixer or like machine, a horizontally arranged casing divided transversely into a working chamber and a charging chamber, and a shaft having bearings at the respective ends of the casing and provided with mixing blades in the working chamber.

15. In a rubber mixer or like machine, a casing divided transversely into a working chamber and a feed chamber, said feed chamber having an opening at the top and said working chamber having an opening at the bottom, a bladed rotor in the working chamber, and a power-operated feed device in the feed chamber.

16. In a machine of the character described, a working chamber, a rotor therein for moving the material back and forth, said chamber having an opening at the end for the introduction of the materials to be mixed, and a charge container in direct and free communication with said working chamber by way of said opening, said opening approximating in depth the distance between the side wall of the working chamber and the rotor shaft.

17. In a machine of the character described, a working chamber, a rotor therein having a horizontal shaft, said chamber being open at the end for the introduction of the materials to be mixed, the end opening in the chamber having a radial measurement approximating the distance between the rotor shaft and the side wall of the casing, and a charge container or chamber at the end of the working chamber for guiding the material to said opening, said charge container being in free and direct communication with said working chamber by way of said opening, whereby large rubber chunks may be introduced into the working chamber from the end.

18. In a rubber compounding machine, a horizontal working chamber, a rotor therein for working the material back and forth in said chamber, and a charge container at the end of the working chamber to receive chunks of rubber to be supplied to said working chamber, said working chamber and said charge container being in direct communication with each other by way of an end opening curved about the rotor shaft, through which the rubber chunks to be treated pass freely and directly from the charge container to the working chamber.

19. In a machine of the character described, a working chamber, a rotor therein for working the material back and forth, said chamber having a flared opening associated with the end thereof of sufficient size to permit comparatively large chunks of rubber or the like to pass through the same.

20. In a rubber mixer or like machine, a generally cylindrical horizontally arranged casing divided transversely into a mixing chamber and a charging chamber in free communication with each other, a bladed rotor in the mixing chamber, and means in the charging chamber for forcing the material therefrom into the mixing chamber while the blades are rotating, said charging chamber having a suitable charging opening.

21. In a rubber mixer or like machine, a horizontally arranged casing divided into a working chamber and a charging chamber, a bladed rotor in the working chamber and a charging plunger in the charging chamber, said chambers arranged end to end, and in free communication with each other.

22. In a rubber mixer or like machine, a horizontally arranged casing having a working chamber and a charging chamber in communication with each other, and a horizontally movable plunger in the charging chamber.

23. In a machine of the character described, a working chamber, a rotor therein, said chamber having an opening at the end for the introduction of the materials to be mixed, which opening is flared to facilitate the entrance of such material, and a charge container into which the material is dumped, in direct and free communication with the working chamber by way of said flared opening.

24. In a machine of the character described, a working chamber, a rotor therein having a shaft, the end of the chamber being open around the shaft, and a charge container in direct and free communication with said chamber by way of said opening.

25. In a machine of the character described, a mixing chamber, a rotor therein, said chamber having an end opening for the introduction of the material to be mixed, through which the material is introduced in a direction generally lengthwise of the rotor shaft, and means for closing said opening.

26. In a machine of the character described, a working chamber, a rotor therein for working the material back and forth, said chamber having an opening at the end through which the material to be mixed is introduced in a direction generally lengthwise of the rotor shaft, a charge container in direct and free communication with said working chamber by way of said opening, and means for closing said opening during the mixing operation.

27. In a machine of the character described, a working chamber, a rotor therein for working the material back and forth, said chamber having an opening at the end for the introduction of the material to be mixed, a charge container in direct communication with said working chamber by way of said opening, and means for cutting off communication between the working chamber and the charge container.

28. In a rubber mixer or like machine, a rotary discharge valve having a body, and a discharge opening extending through said body.

29. In a machine of the character described, a working chamber, a rotor therein, said working chamber having an opening at the end through which the material is introduced in a direction generally lengthwise of the rotor shaft, a charge container in communication with said working chamber by way of said opening, and means for cutting off the working chamber from the charge container during the mixing.

30. In a machine of the character described, a working chamber, a rotor therein, said working chamber having an opening at the end through which the material is introduced in a direction generally lengthwise of the rotor shaft, a charge container in communication with said working chamber by way of said opening, and means for cutting off the working chamber from the charge container during the mixing, comprising a movable closure element adapted to close the working chamber at the end thereof.

31. In a rubber mixer or like machine, a working chamber having a constricted intermediate portion and an intermediate discharge opening, and a rotary discharge valve controlling said discharge opening.

32. In a rubber mixer or like machine, a working chamber, a mixing element therein, said chamber having a discharge opening, a rotary valve controlling said opening, and gearing for operating said valve.

33. In a rubber mixer, a mixing chamber having a discharge opening in the lower portion thereof, a rotary cylindrical valve controlling said opening, and gearing for operating said valve.

34. In a machine of the character described, a chamber wherein the material is adapted to be mixed, a bladed rotary mixing element in said chamber, said chamber having an opening at at least one end through which the different ingredients to be mixed are introduced in a direction generally lengthwise of the rotary mixing element, and a movable closure for closing the end of the mixing chamber during mixing so as to prevent the escape of the material therefrom.

35. The method of mixing rubber or similar material, which comprises working the material back and forth in a suitable mixing chamber so as to mash it against the side wall of such chamber, and introducing additional material into the chamber by forcing such material positively into the mixing chamber at the end thereof in a direction which is generally in line with the back and forth movement of the material already in the chamber.

36. The method of mixing rubber or similar material, which comprises working the material back and forth in a suitable mixing chamber, and introducing additional material from the end of the mixing chamber under pressure so that such additional material is forced into the chamber in a direction which is generally in line with the back and forth movement of the material already in the chamber.

37. In a machine of the character described, a horizontally arranged mixing cylinder, a rotor journaled therein, having blades for moving the material back and forth, said cylinder having an opening in the end through which comparatively large lumps of material can be introduced into the chamber in a direction generally lengthwise of the rotor axis, said opening extending approximately from the periphery of the cylinder to the rotor shaft, and a sliding element for closing said opening during the mixing.

38. In a rubber mixer or like machine, a working chamber having a hollow water cooled extrusion rib, and a rotor having its axis substantially at right angles to said rib and coöperating therewith.

39. In a rubber mixer, a working chamber, a rotor for moving the material back and forth in said chamber, and means for charging said chamber from the end.

40. In a rubber mixer, a working chamber, a rotor therein for moving the material back and forth, and pressure means for forcing the material into said chamber at one end.

41. In a rubber mixer, a working chamber, a rotor therein for moving the material back and forth, and pressure means for forcing the material into said chamber at one end in a direction generally parallel to the rotor axis.

42. In a rubber mixer, a horizontal working chamber, a rotor therein, and pressure means independent of the rotor for feeding material into said chamber in a direction generally longitudinally thereof.

43. In a rubber mixer, a horizontal working cylinder open at the end, a rotor therein having mixing blades for moving the material back and forth, and pressure means for forcing the fresh material to said blades through said cylinder opening in a direction generally longitudinally of the cylinder.

In witness whereof we have hereunto set our hands on the 18th day of December, 1917.

DAVID R. BOWEN.
CARL F. SCHNUCK.